June 22, 1965 A. B. EUGA 3,189,935
TUBULAR-ARTICLE CLEANING DEVICE
Filed Jan. 28, 1963 6 Sheets-Sheet 1

INVENTOR.
ARTHUR B. EUGA
BY Woodling, Krost,
Granger and Rust,
ATTORNEYS

INVENTOR.
ARTHUR B. EUGA
BY Woodling, Krost,
Granger and Rust,
ATTORNEYS

June 22, 1965  A. B. EUGA  3,189,935
TUBULAR-ARTICLE CLEANING DEVICE
Filed Jan. 28, 1963  6 Sheets-Sheet 4

INVENTOR.
ARTHUR B. EUGA
BY Woodling, Krost,
Granger and Rust,
ATTORNEYS

United States Patent Office 3,189,935
Patented June 22, 1965

3,189,935
TUBULAR-ARTICLE CLEANING DEVICE
Arthur B. Euga, 728½ Franklin Ave., Columbus, Ohio
Filed Jan. 28, 1963, Ser. No. 254,059
16 Claims. (Cl. 15—511)

This application is a continuation-in-part of my application Serial No. 175,520, filed February 26, 1962, now abandoned.

This invention relates in general to cleaning devices and, more particularly, to devices to clean tubular or cylindrical objects, for example tubular fluorescent lamps which may or may not be perfect cylinders, they may have grooves or depressions therein.

A principal object of my invention is to provide a cleaning element or elements which cleans the surface of the object being passed through the device.

Another object of my invention is to provide a novel and improved form of cleaning device of a simplified construction for tubes, solid rods, or strips of material that accumulate and receive dust or foreign substances from the air surrounding their normal storage or usage.

A still further object of my invention is to provide a simplified form of cleaning device for multiple objects of the same general dimensions which can be grouped or held together as a unit while being passed through the cleaning elements.

A still further and more detailed object of my invention is to provide a simplified form of cleaning device for cleaning exterior surfaces of objects of known regular production items which may be either wet or dry cleaning action to the objects passed through the device such as round structural tubing shapes possessing certain known tolerance dimensions.

Another object of the invention is to provide a cleaning device wherein the object to be cleaned is first passed through a moistened sponge within a container and then in passing out through an exit aperture in the container, it is engaged by a resilient wiper to wipe the object dry.

Other objects and a fuller understanding of the invention may be had by referring to the following description and claims, taken in conjunction with the accompanying drawings, in which:

In the embodiment of my invention illustrated in the drawings, corresponding parts have similar reference numerals throughout the several views.

Figure 1:
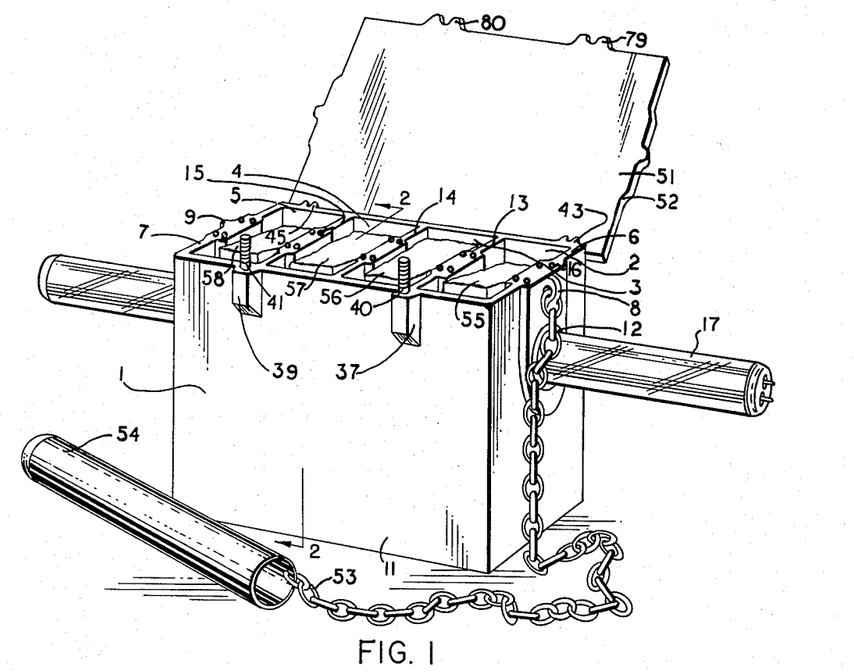
FIGURE 1 is an isometric view of a cleaning device for tubular devices such as fluorescent lamps illustrating one form in which my invention may be embodied.
Figure 2:
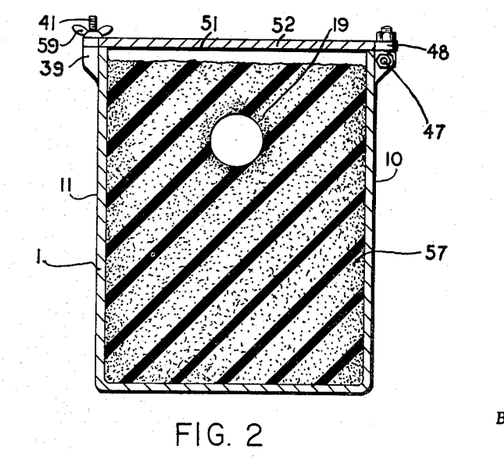
FIGURE 2 is a transverse sectional view of a container compartment of the cleaning device of FIGURE 1.

FIGURES 1 and 2 show a preferred embodiment of the invention but this embodiment is by way of illustration and not limitation on the invention.

Figure 5:
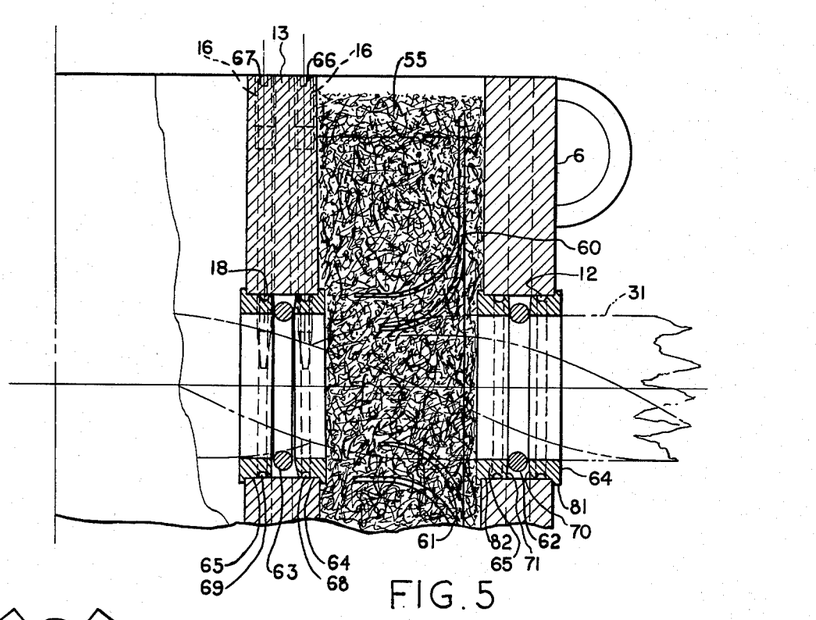
FIGURE 5 is a view somewhat similar to FIGURE 3, this view showing an O-ring contacting the outer surfaces of a fluorescent lamp.

The cleaning device of my invention may be embodied in a multiple compartment container 1 which is easily portable. This container 1 has a plurality of compartments or receptacles and four such compartments 2, 3, 4 and 5 have been illustrated. The container 1 has end walls 6 and 7 and side walls 10 and 11. Projecting bosses 8 and 9 are provided on the end walls 6 and 7, respectively. Intermediate compartment walls or dividing walls 13, 14 and 15 are provided in the container 1 to establish the plurality of compartments or receptacles 2, 3, 4 and 5. An aperture 12 is provided in the thickened boss 8 in end wall 6. This is of a size slightly greater than necessary to receive objects to be cleaned. This preferred embodiment illustrates the cleaning of tubular objects such as fluorescent lamps and, accordingly, this aperture 12 is of a size and shape to easily accommodate objects such as fluorescent lamps 17. The upper mid-portion of the dividing walls 13, 14 and 15 are thickened similar to the projecting bosses 8 and 9 and apertures are provided therein aligned with the aperture 12. FIGURE 5 illustrates one such aperture 18 in the dividing wall 13. Sponges or some form of resilient pads are provided in each of the compartments 2, 3, 4 and 5. These sponges may be natural or synthetic and, as shown, the four compartments are filled with sponges 55, 56, 57 and 58, respectively. Each sponge has an aperture 19 therein which is of a size sufficiently small to frictionally engage the objects such as lamps 17, to be cleaned.

A popular size of fluorescent lamp available commercially has a nominal diameter of 1.5 inches, however, the diameter of the tubular glass lamp varies and may have a range between 1.425 to 1.505 inches O.D. Accordingly, the size and shape of the aperture 19 in the sponges is slightly smaller than this range of diameters of lamps to be cleaned. The diameter may be 1⅜ inches for example, of this sponge aperture 19.

Figure 7:
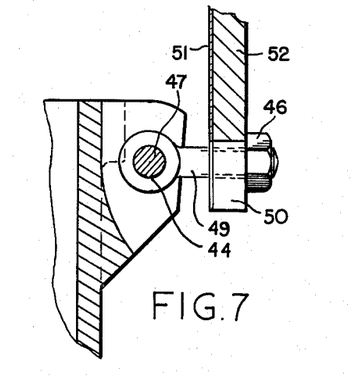
FIGURE 7 is a partial view of lid hinge parts pivoted to a container segment.

The container 1 may be sealed by a lid or cover 52 and a flat resilient sealing gasket 51. FIGURES 1 and 2 show one method of securing the cover 52 to the container 1. Boss projections 37 and 39 are provided on the side wall 11 and carry threaded stud bolts 40 and 41 extending vertically. Lid projections 79 and 80 are provided on the cover 52 to partially surround the stud bolts 40 and 41 and then wing nuts 59 may be threaded onto the bolts 40 and 41 against the top of the cover 52. The other side of the cover 52 may be removably hinged to the container 1 as shown in FIGURE 7. The rear side wall 10 has vertically grooved boss projections 43 and 45. The boss projection 43 has a horizontal hinge pin hole 44. A hinge pin 47 is journalled in this hole 44 and carries a bolt 49. A nut 46 may be threaded on the bolt 49 to engage the top of the lid 52 with lid projections 50 partially surrounding the bolt 49. Vertically grooved boss projection 45 is provided with a similar construction. When all four nuts 46 and 59 are tightened down on the cover 52, the resilient sealing gasket 51 will seal the container 1.

FIGURE 5 illustrates the wiper means to elastically engage and wipe any object passed through the aligned apertures 12 and 13. This wiper means is illustrated in FIGURE 5 as being O-rings 62 and 63, which O-rings are one form of a resilient wiper means which is substantially impenetrable by liquid. In other words, it is relatively impenetrable compared to the sponges 55–58. A medium soft neoprene O-ring has been found to be satisfactory to elastically engage and wipe an object of circular cross section such as the fluorescent lamp 17. The wiping means or O-rings 62 and 63 are held in place by means of non-compressible rings 64 and 65. These rings may be made of metal, for example, and a pair are mounted within each of the apertures 12 or 18 in the end walls or dividing walls. The rings 64 and 65 have flanges 81 and 82, respectively, which abut the walls adjacent the apertures 12 and 18. External peripheral grooves 68 and 69 are provided in the rings 64 and 65, respectively. These grooves may be engaged by the tapered ends of threaded pins 66 and 67, respectively, which are threaded in interconnecting holes 16 vertically in the end and dividing walls. The grooves 68 and 69 are slightly out of axial alignment with the threaded pins 66 and 67 so that as these threaded pins engage the grooves, the ring flanges 81 and 82 are forced tightly against the walls to provide a liquid tight seal. The rings 64 and 65 are provided with facing end surfaces 70 and 71, respectively. These are O-ring abutting surfaces which are generally vertical when the container 1 is on its base. The facing end surface 71 is a vertical planar abutting surface. The facing end surface 70 on ring 64 is a conical surface which diverges from the facing end surface 71 in a radially outward direction. Because of these diverging surfaces 70 and 71, the O-ring 62, for example, is suspended in coaxial alignment with the apertures 12 and 18 and in coaxial alignment with the sponge apertures 19. This coaxial suspension of the O-ring 62 is established because the contact between O-ring 62 and the facing end surface 70 is on a circular line having a diameter smaller than the center line diameter of the O-ring. This center line diameter is defined as one-half the sum of the outside and inside diameters. This unique suspension of the O-ring 62 permits use of an O-ring having an inside diameter smaller than the smallest of the range of diameters of lamps to be cleaned, yet permitting expansion of this O-ring 62 to elastically engage and wipe any said fluorescent lamp within the aforesaid range of diameters. The O-ring makes sealing engagement with the facing end surfaces 70 and 71 as well as with the lamp and, thus, wipes liquid from the surface of the lamp passed through this O-ring. For small size diameters of lamps within the aforesaid range of diameters, the O-ring is radially expanded only slightly. For large size diameter lamps within the aforesaid range, the O-ring 62 is expanded to its maximum permissible extent to substantially fill the entire trapezoidal shaped space between the rings 64 and 65. In either case, sealing engagement is made between the O-ring 62 and the non-compressible rings 64 and 65.

Figure 4:
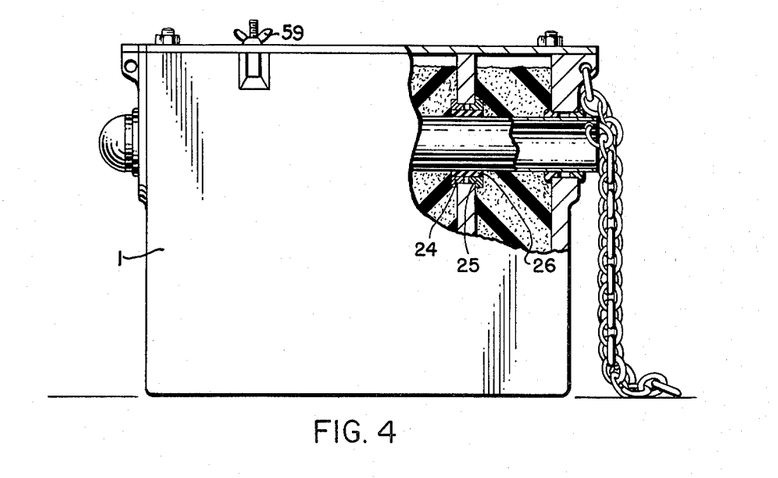
FIGURE 4 is a view somewhat similar to FIGURE 3, this view showing a broken section of an inserted sealing tube plug attached to the container by a chain.

A tubular sealing plug 54 is attached by a bail link chain 53 to the boss projection 8 and when this sealing plug 54 is inserted through the aligned apertures 12 and 18, this will seal the container 1. In this condition, the container 1 may be inverted or laid on its side so that liquid, which may partially fill the receptacles 2, 3, 4 and 5, may better saturate the entire volume of the sponges 55–58. These sponges are adapted to contain cleaning and rinsing liquids. As an example, the sponges 55 and 57 may contain a cleaning acid and spoges 56 and 58 may contain water for rinsing. Alternatively, a soap or detergent solution may be provided in one or both of sponges 55 and 57.

The object or lamp to be cleaned may first be inserted through the end wall 6 and pass through the container 1 to emerge from the end wall 7. Accordingly, it will be seen that it passes through a plurality of sponges, four in this case, and that after each successive sponge it is passed through a wiper means shown as an O-ring 62 or 63. Accordingly, each compartment or receptacle 2–5 has an exit aperture with a wiper means coaxially positioned in this exit aperture. This wiper means wipes off the liquid so that the lamp is substantially dry and the liquid from one compartment does not contaminate the different liquid in the succeeding compartment. Accordingly, when the lamp has been passed through the cleaning device of this invention, it has been cleaned and substantially dried so that the lamp may be immediately placed back in service. This is a substantial improvement over cleaning the lamp in an open bucket with a manually applied wet sponge, since this often will cause liquid to get under the insulating washer on the end of the fluorescent lamp 17, which washer insulates the two terminal pins thereon. The cleaning liquid is often contaminated and this can leave a deposit on the inside of this insulating washer to provide an electrical leakage path which will prevent the fluorescent lamp from operating correctly. In using the cleaning device of my invention, the insulating washers at the ends of the lamps 17 do not get wet and, hence, no such leakage path can develop. Also, the fluorescent lamps contain poison powder and, hence, the lamps should not be broken for this powder to come in contact with humans or animals. The cleaning device of the present invention is easy to use and subjects such easily breakable objects as fluorescent lamps to a gentle but thorough cleaning to properly clean lamps which may be quite filthy from operating in industrial surroundings such as in foundries and other manufacturing operations.

Figure 14:
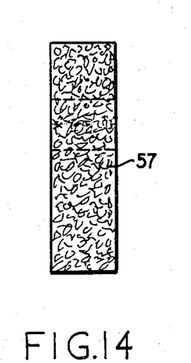
FIGURE 14 is an end elevational view of a one piece sponge having a hole therethrough.
Figure 15:
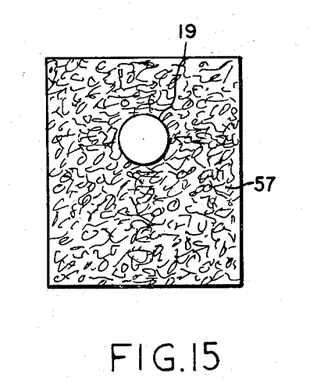
FIGURE 15 is a front elevational view of FIGURE 14.

FIGURES 14 and 15 illustrate one of the sponges 57 as removed from its respective compartment.

Figure 6:
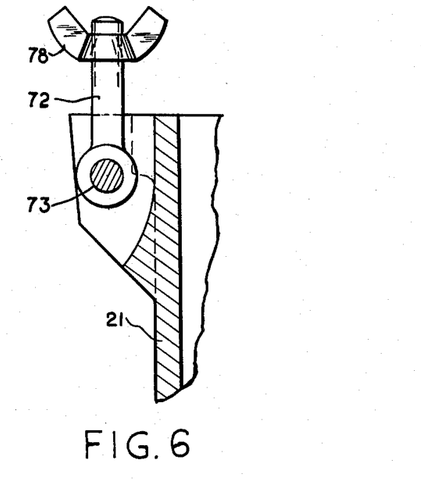
FIGURE 6 is a partial view of threaded extending parts pivoted to a container segment.
Figure 8:
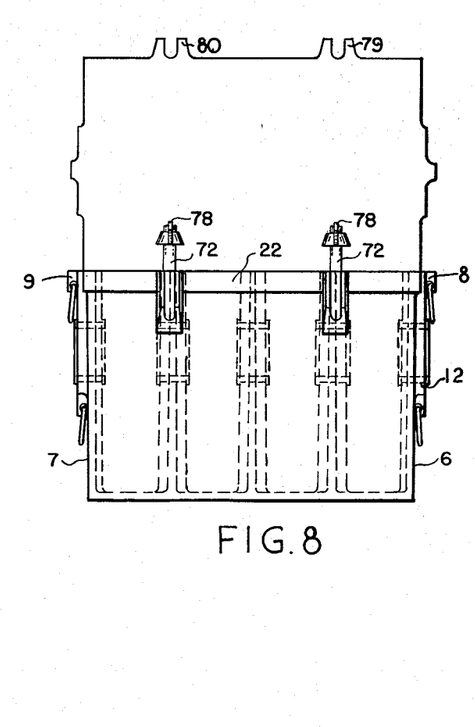
FIGURE 8 is an elevational view of a modified container having internal parts illustrated as dotted lines of container walls, disclosing tapered narrowing compartments top to bottom, also, tapered thickening wall sections.
Figure 9:
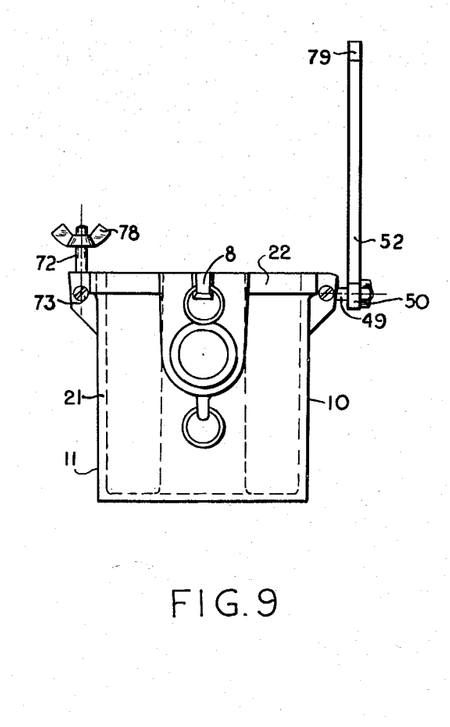
FIGURE 9 is an end view of the container of FIGURE 8.

FIGURES 6, 8 and 9 illustrate a slightly modified form of container 21. This container 21 has a strengthing flange 22 around the upper edge of the end walls 6 and 7 and side walls 10 and 11. The means for hingedly mounting the cover 52 to the container 21 may be the same as in FIGURES 1 and 2. FIGURES 6, 8 and 9, however, show pivoted bolts 72 which are mounted on pivot pins 73. Wing nuts 78 are threaded on these pivoted bolts 72 to engage the lid projections 79 and 80 to secure the cover 52 to the container 21.

Figure 3:
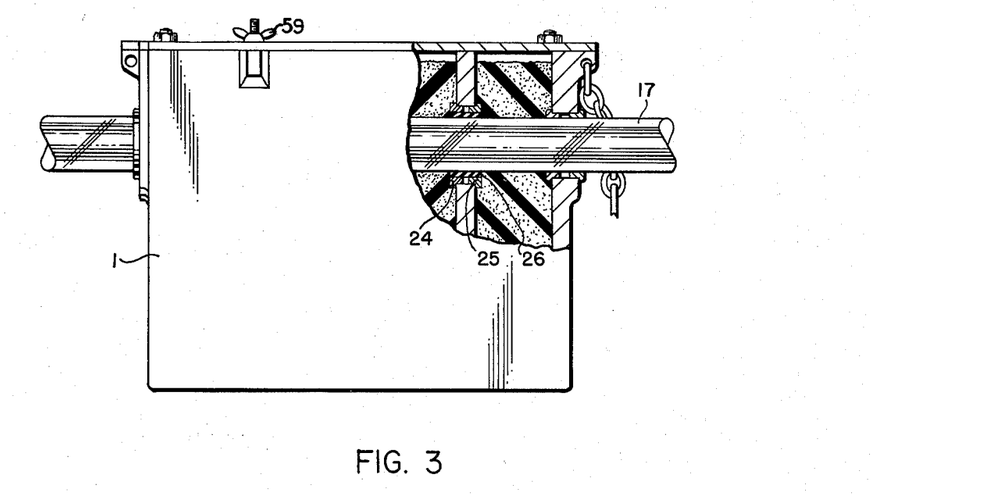
FIGURE 3 is an elevational view which is partly in broken section of container walls, sponges, and a fluorescent lamp.

FIGURES 3 and 4 illustrate a modified form of wiper means. Non-compressible rings 24 and 25 may be secured in each of the end walls and dividing walls in any suitable manner such as the means used in FIGURES 1, 2 and 5. A resilient liquid impenetrable wiper 26 is carried on the inner periphery of each of these rings 24 and 25. This may be rubber or neoprene which is medium soft and may be bonded to the rings 24 and 25. Such wipers resiliently engage the fluorescent lamp or other tubular object to wipe it substantially dry.

Figure 16:
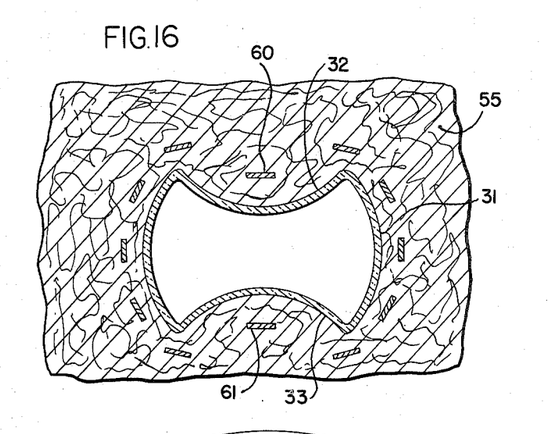
FIGURE 16 is a partial transverse sectional view of spring fingers urging the cleaning sponge into grooves in a lamp; and, FIGURE 17 is an elevational view of a resilient washer as removed from the sponge.
Figure 17:
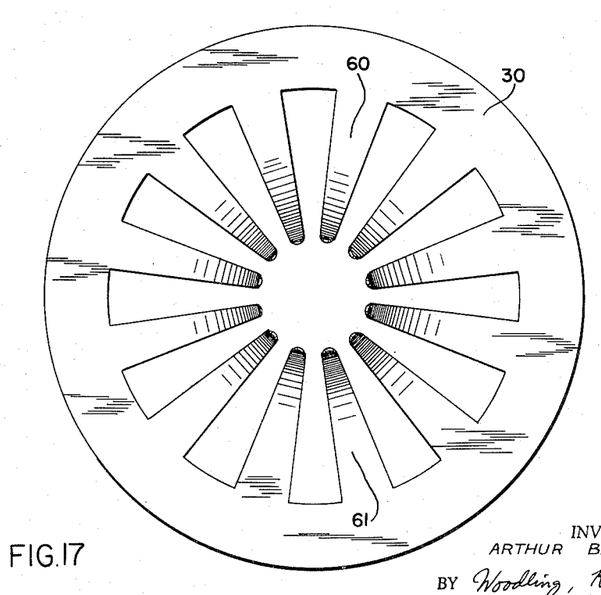

FIGURE 17 illustrates a resilient or elastic washer 30 as removed from the sponge 55. This resilient washer may be made of spring metal or rubber or other suitable substance and has inwardly extending integral fingers such as fingers 60 and 61. FIGURES 5 and 16 illustrate how this resilient washer 30 may be used. These resilient fingers 60 and 61 may be used to better clean a fluorescent lamp 31 which has grooves 32 and 33 therein. These may be spiral flutes or may be longitudinally extending grooves in the lamp. The spring fingers 60 and 61 extend integrally from the resilient washer 30 and the inner ends thereof are disposed within the sponge such as sponge 55 and are disposed substantially parallel to the lamp 31. The inherent resilience of these spring fingers 60 and 61 urges the sponge radially inwardly to better engage these grooves 32 and 33 in the lamp 31. The fingers 60 and 61 may be bonded to the sponge, or may be merely inserted in slits cut into desired locations in the sponge.

Figures 10, 11:
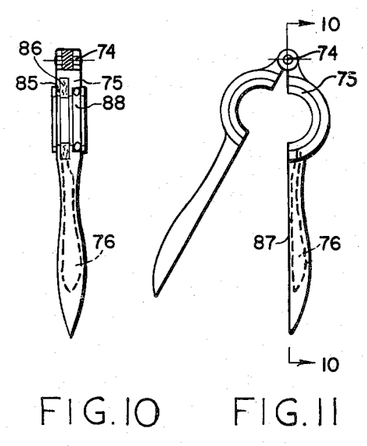
FIGURE 10 is a sectional view on line 10—10 of FIGURE 11 showing a pivoted bifurcated hand cleaning device for circular objects.
FIGURE 11 is an end view of FIGURE 10 as an opened hinged bifurcated device.

FIGURES 10 and 11 show a more simplified form of cleaning device 75. This cleaning device 75 is in the form of pivoted bifurcated hand device having a pivot 74 parallel to the axis of the device. When the device 75 is closed, there is formed a circular receptacle 85 containing a segmented ring resilient sponge 86. This sponge has a tail extending down into a handle compartment 76. The inner surface 87 of this handle compartment is resilient so that when the hand held cleaning device 75 is immersed in a cleaning liquid such as a pail of liquid, the resilient inner surface may be squeezed to compress the sponge to thoroughly wet the same. Axially displaced from the sponge 86 is a segmented wiper O-ring 88. This O-ring 88 may be held between facing end surfaces which preferably diverge in a radially outward direction just as facing end surfaces 70 and 71 diverge in FIGURE 5. This establishes coaxial mounting of the O-ring 88. As viewed in FIGURE 10, the entrance end of the cleaning device 75 is at the left so that tubular objects may be inserted and wetted and cleaned by frictional engagement with the inner periphery of the sponge 86. Next, the tubular objects pass through the wiper O-ring 88 which elastically engages and wipes any object passed therethrough.

Figure 12:
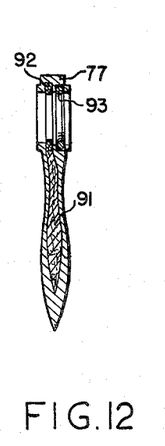
FIGURE 12 is a sectional view on line 12—12 of FIGURE 13 showing a unitary cleaning and drying hand device.
Figure 13:
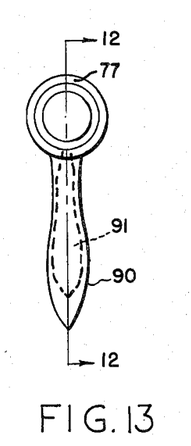
FIGURE 13 is an end view of FIGURE 12.

FIGURES 12 and 13 illustrate the simplest form of my invention. These FIGURES 12 and 13 show a hand held cleaning device 77 which may be made from a single piece of some semi-flexible material such as semi-soft rubber. The cleaning device 77 has an extending handle 90 with a sponge 91 within the handle and communicating with a circular ring sponge 92 in the head of the cleaning device 77. A wiper O-ring 93 is again mounted axially displaced from the circular sponge 92. Again the sponge 92 will clean a tubular object and the O-ring 93 will wipe it substantially dry as such object is passed through the cleaning device 77. The semi-flexible material of the handle 90 permits the sponge 91 herein to be compressed while the cleaning device 77 is immersed in liquid in order to wash out the sponges 91 and 92 and thoroughly moisten them.

The foregoing embodiments of the invention illustrate how an object which is generally tubular or cylindrical may be passed through a cleaning device for cleaning and quickly drying same. The sponge apertures in the one or plurality of sponges in each device frictionally engage the external surface of the object to clean such object. Immediately afterward, the object passes through an exit aperture in which wiper means is provided. This wiper means is elastic to expand as needed for a given range of diameters of objects and, thus, substantially dry the object as it passes through the cleaning device.

Although this invention has been described in its preferred form with a certain degree of particularly, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A cleaning device for elongated objects of a given cross sectional size and shape, comprising in combination, container means,
   an end wall in said container means,
   resilient sponge means in said container means adapted to hold cleaning liquid,
   said end wall having an exit aperture,
   an aperture in said sponge means aligned with said exit aperture and of said given size and shape to frictionally engage an object which may be passed through said aligned apertures,
   resilient liquid impenetrable wiper means of said given size and shape and coaxially retained in said exit aperture to elastically engage and wipe any said object passed therethrough, and said wiper means and sponge means being removable from said container means without disassembly of said container means.

2. A tube cleaning device comprising in combination, container means,
   end walls in said container means,
   a plurality of receptacles within said container means and separated by dividing walls,
   resilient sponge means in each of said receptacles adapted to hold cleaning and rinsing liquids,
   each receptacle having an exit aperture with the plurality of apertures in said dividing walls and said end walls being aligned,
   circular apertures in said sponge means aligned with said wall apertures and adapted to frictionally engage a tube which may be passed through said aligned apertures,
   and circular resilient liquid impenetrable wiper means coaxially retained in said exit apertures to elastically engage and wipe any said tube passed therethrough.

3. A tube cleaning device comprising in combination, container means,
   an end wall in said container means,
   resilient sponge means in said container means adapted to hold cleaning liquid,
   said container means end wall having an exit circular aperture,
   a circular aperture in said sponge means aligned with said exit aperture and adapted to frictionally engage a tube which may be passed through said aligned apertures,
   circular resilient liquid impenetrable wiper means coaxially retained in said exit aperture to elastically engage and wipe any said tube passed therethrough, and said wiper means and sponge means being removable from said container means without disassembly of said container means.

4. A cleaning device in accordance with claim 3, including manually grasped handles connected to said container means for manual operation of said cleaning device along any said tube.

5. A tube cleaning device comprising in combination, a liquid tight container,
   end walls in said container,
   resilient sponge means in said container adapted to hold a cleaning liquid,
   one of said container end walls having an exit circular aperture,
   a circular aperture in said sponge means aligned with said wall aperture and adapted to frictionally engage a tube which may be passed through said aligned apertures,
   spaced apart facing end surfaces in said exit aperture with said facing end surfaces diverging in radially outward direction,
   and resilient O-ring means coaxially retained by engagement with said diverging facing end surfaces to elastically engage and wipe any said tube passed therethrough.

6. A tube cleaning device comprising in combination, a liquid tight container,
   end walls in said container, an aperture in each end wall,
   a plurality of receptacles within said container and separated by dividing walls, an aperture in each dividing wall,
   one of said apertures in each receptacle serving as an exit aperture,
   a resilient sponge in each of said receptacles adapted to hold cleaning and rinsing liquids,
   the apertures in said dividing walls and said end walls being aligned,
   circular apertures in the sponges within said receptacles aligned with said wall apertures and adapted to frictionally engage a tube which may be passed through said aligned apertures, spaced apart facing end surfaces in each of said exit apertures with said facing end surfaces diverging in a radially outward direction, and resilient O-rings coaxially retained by engagement with said diverging facing end surfaces to elastically engage and wipe any said tube passed therethrough.

7. A tubular lamp cleaning device comprising in combination, a liquid tight container, end walls in said container, resilient sponge means in said container adapted to hold a cleaning liquid, one of said container end walls having an exit circular aperture, a circular aperture in said sponge means aligned with said wall aperture and adapted to frictionally engage a tubular lamp which may be passed through said aligned apertures, wall means in said exit aperture and having spaced apart facing end surfaces which diverage in a radially outward direction, resilient O-ring means coaxially retained by engagement with said diverging facing end surfaces, and said O-ring means having an inside diameter less than a given range of diameters of tubular lamps to be cleaned to frictionally and elastically engage and wipe any lamp passed therethrough.

8. A tubular lamp cleaning device comprising in combination, a liquid tight container, end walls in said container, an aperture in each end wall, a plurality of receptacles within said container and separated by dividing walls, an aperture in each dividing wall, one of said apertures in each receptacle serving as an exit aperture, a resilient sponge in each of said receptacles adapted to hold cleaning and rinsing liquids, the apertures in said dividing walls and said end walls being aligned, circular apertures in the sponges within said receptacles aligned with said wall apertures and adapted to frictionally engage a tubular lamp which may be passed through said aligned apertures, relatively rigid ring means mounted in each of said exit apertures and having spaced apart facing end surfaces which diverge in a radially outward direction, a resilient O-ring coaxially retained in each ring means by engagement with said diverging facing end surfaces, and said O-rings having an inside diameter less than a given range of diameters of tubular lamps to be cleaned to frictionally and elastically engage and wipe any said lamp passed therethrough.

9. A tubular lamp cleaning device comprising in combination, a liquid tight container, end walls in said container, a resilient sponge in said container adapted to hold a cleaning liquid, aligned circular apertures in said end walls, an aligned circular aperture in said sponge within said container and adapted to frictionally engage a tubular lamp which may be passed through said aligned apertures and out an exit one of said apertures in said end walls, first and second relatively rigid rings mounted in said exit aperture in spaced apart substantially parallel relationship, facing end surfaces on each set of first and second metal rings, a resilient O-ring disposed between each set of facing end surfaces, one of said facing end surfaces being beveled radially outwardly to engage said O-ring on an annular line of a smaller diameter than the center line diameter of said O-ring to radially retain said O-ring in position in coaxial alignment with said apertures, and said O-ring having an inside diameter less than a given range of diameters of tubular lamps to be cleaned to frictionally and elastically engage and wipe any said lamp passed therethrough.

10. A tubular lamp cleaning device comprising in combination, a liquid tight container, end walls in said container, a resilient sponge in said container adapted to hold a cleaning liquid, axially aligned circular apertures in said end walls, an aligned circular aperture in said sponge within said container and adapted to frictionally engage a tubular lamp which may be passed through said aligned apertures, first and second metal rings mounted in each of said apertures in said end walls in spaced apart substantially parallel relationship, facing end surfaces on each set of first and second metal rings, a resilient O-ring disposed between each set of facing end surfaces, one of said facing end surfaces being beveled radially outwardly to engage said O-ring on an annular line of a smaller diameter than the center line diameter of said O-ring to radially retain said O-ring in position in coaxial alignment with said apertures, said O-rings having an inside diameter less than a given range of diameters of tubular lamps to be cleaned to frictionally and elastically engage and wipe any said lamp passed therethrough, and resilient fingers embedded in said sponge peripherally around the apertures therein and having operating ends substantially parallel to said axis to urge portions of said sponges radially inwardly to engage grooves or depressions in a tubular lamp.

11. A tubular lamp cleaning device comprising in combination, a liquid tight container, end walls in said container, a resilient sponge in said container adapted to hold a cleaning liquid, aligned circular apertures in said end walls, an aligned circular aperture in said sponge within said container and adapted to frictionally engage a tubular lamp which may be passed through said aligned apertures, first and second metal rings mounted in each of said apertures in said end walls in spaced apart substantially parallel relationship, facing end surfaces on each set of first and second metal rings, a resilient O-ring disposed between each set of facing end surfaces, and one of said facing end surfaces being beveled radially outwardly to engage said O-ring on an annular line of a smaller diameter than the center line diameter of said O-ring to radially retain said O-ring in position in coaxial alignment with said apertures to frictionally and elastically engage and wipe any said lamp passed therethrough.

12. A fluorescent lamp cleaning device comprising in combination, a liquid tight container, end walls in said container, a plurality of receptacles within said container and separated by dividing walls, a resilient sponge in each of said receptacles adapted to hold cleaning and rinsing liquids, each of said dividing walls and said end walls having a circular aperture, said apertures being axially aligned, each of said sponges having a circular aperture adapted to frictionally engage a fluorescent lamp which may be passed through said aligned apertures, first and second metal rings mounted in each of said apertures in said dividing walls and end walls in spaced apart substantially parallel relationship, facing end surfaces on each set of first and second metal rings, a resilient O-ring disposed between each set of facing end surfaces, one of said facing end surfaces being beveled radially outwardly to engage said O-ring on an annular line of a smaller diameter than the center line diameter of said O-ring to radially retain said O-ring in position in coaxial alignment with said apertures, said O-rings having an inside diameter less than a given range of diameters of fluorescent lamps to be cleaned to frictionally and elastically engage and wipe any said fluorescent lamp passed therethrough, and resilient fingers embedded in said sponges peripherally around the apertures therein and having operating ends substantially parallel to said axis to urge portions of said sponges radially inwardly to engage grooves or depressions in a fluorescent lamp.

13. A fluorescent lamp cleaning device comprising in combination, a liquid tight container, end walls in said container, a plurality of receptacles within said container and separated by dividing walls, a resilient sponge in each of said receptacles adapted to hold cleaning and rinsing liquids, each of said dividing walls and said end walls having a circular aperture, said apertures being axially aligned, each of said sponges having a circular aperture adapted to frictionally engage a fluorescent lamp which may be passed through said aligned apertures, first and second metal rings mounted in each of said apertures in said dividing walls and end walls in spaced apart substantially parallel relationship, facing end surfaces on each set of first and second metal rings, a resilient O-ring disposed between each set of facing end surfaces, and one of said facing end surfaces being beveled radially outwardly to engage said O-ring on an annular line of a smaller diameter than the center line diameter of said O-ring to radially retain said O-ring in position in coaxial alignment with said apertures to frictionally and elastically engage and wipe any said fluorescent lamp passed therethrough.

14. A fluorescent lamp cleaning device comprising in combination, a liquid tight container, end walls in said container, a plurality of side-by-side receptacles within said container between said end walls and separated by dividing walls, a cover for said container covering each of said receptacles in liquid tight relationship, a resilient sponge in each of said receptacles adapted to hold cleaning and rinsing liquids, each of said dividing walls and said end walls having a circular aperture, said apertures being axially aligned, each of said sponges having a circular aperture adapted to frictionally engage a fluorescent lamp which may be passed through said aligned apertures, first and second metal rings mounted in each of said apertures in said dividing walls and end walls in spaced apart substantially parallel relationship, facing end surfaces on each set of first and second metal rings, a rubber O-ring disposed between each set of facing end surfaces, one of said facing end surfaces being beveled radially outwardly to engage said rubber O-ring on an annular line of a smaller diameter than the center line diameter of said O-ring to radially retain said O-ring in position in coaxial alignment with said apertures, said O-rings having an inside diameter less than a given range of diameters of fluorescent lamps to be cleaned to frictionally and elastically engage and wipe any said fluorescent lamp passed therethrough, and a cylindrical plug flexibly attached to said container and adapted to be disposed through said aligned apertures in engagement with said O-rings to effectively seal each of said receptacles so that said container may be inverted to better moisten said sponges around said apertures.

15. A fluorescent lamp cleaning device comprising in combination, a liquid tight container, end walls in said container, a plurality of side-by-side receptacles within said container between said ends walls and separated by dividing walls, a cover for said container covering each of said receptacles in liquid tight relationship, a resilient sponge in each of said receptacles adapted to hold cleaning and rinsing liquids, each of said dividing walls and said end walls having a circular aperture, said apertures being axially aligned, each of said sponges having a circular aperture adapted to frictionally engage a fluorescent lamp which may be passed through said aligned apertures, a wiper retainer mounted in each of said apertures in said dividing walls and end walls, said wiper retainer including first and second metal rings with a rubber O-ring disposed therebetween, means retaining each of said first and second metal rings in the respective walls in spaced apart substantially parallel relationship, facing end surfaces on each set of first and second metal rings, one of said facing end surfaces being beveled radially outwardly to engage said rubber O-ring on an annular line of a smaller diameter than the center line diameter of said O-ring to radially retain said O-ring in position in coaxial alignment with said apertures, said O-rings having an inside diameter less than a given range of diameters of fluorescent lamps to be cleaned to frictionally engage and wipe any said fluorescent lamp passed therethrough, said O-rings having a durometer within the range of 30 to 45 to yieldingly engage any said fluorescent lamp, a plurality of resilient fingers embedded in each of said sponges around the periphery of said apertures therein, each resilient finger having a mounting end substantially perpendicular to said axis and having an operating end substantially parallel to said axis to urge portions of said sponges radially inwardly to engage grooves or depressions in a fluorescent lamp, and a cylindrical plug flexibly attached to said container and adapted to be disposed through said aligned apertures in engagement with said O-rings to effectively seal each of said receptacles so that said container may be inverted to better moisten said sponges around said apertures.

16. A tube cleaning device comprising in combination, container means, an end wall in said container means, said container means end wall having an exit circular aperture, resilient sponge means, said resilient sponge means having a first portion with a circular aperture aligned with said exit aperture and adapted to frictionally engage a tube which may be passed through said aligned apertures, said resilient sponge means having a second portion adjacent said first portion and depending into said container means, circular resilient liquid impenetrable wiper means coaxially retained in said exit aperture to elastically engage and wipe any said tube passed therethrough, and said wiper means and sponge means being removable from said container means without disassembly of said container means.

References Cited by the Examiner

UNITED STATES PATENTS

| | | | |
|---|---|---|---|
| 2,229,071 | 1/41 | Godstrey | 15—256.6 |
| 2,359,568 | 10/44 | Logan | 15—88 X |

CHARLES A. WILLMUTH, *Primary Examiner.*